United States Patent [19]

Itoh et al.

[11] Patent Number: 4,825,305

[45] Date of Patent: Apr. 25, 1989

[54] APPARATUS FOR RECORDING AND REPRODUCING DIGITAL USING DYNAMIC RANGE COMPRESSION

[75] Inventors: Shigeyuki Itoh, Yokohama; Yoshizumi Watatani, Fujisawa; Akitoshi Tsunoka, Kamakura, all of Japan

[73] Assignees: Hitachi, Ltd., Tokyo; Hitachi Video Engineering Incorp., Kanagawa, both of Japan

[21] Appl. No.: 77,175

[22] Filed: Jul. 24, 1987

[30] Foreign Application Priority Data

Jul. 28, 1986 [JP] Japan .................... 61-175616

[51] Int. Cl.$^4$ .............................................. G11B 5/09
[52] U.S. Cl. ............................................ 360/8; 360/32
[58] Field of Search ................ 360/8, 32; 375/122; 381/29, 30, 31, 32, 33, 34, 35; 358/260, 261

[56] References Cited

U.S. PATENT DOCUMENTS

4,558,378 12/1985 Shibata et al. .................. 360/19.1

FOREIGN PATENT DOCUMENTS

55-32296 3/1980 Japan .
58-222402 12/1983 Japan .
58-163054 3/1985 Japan .................. 375/122
0119204 1/1954 U.S.S.R. .................. 381/29

OTHER PUBLICATIONS

"Compression-Expansion Technigues for Wide Dynamic Range Recording", J. Vanderkooy, *Review of Scientific Instruments* vol. 46, No. 12, pp. 1689-1690, Dec. 1975.

*Primary Examiner*—Alan Faber
*Assistant Examiner*—Kevin J. Fournier
*Attorney, Agent, or Firm*—Antonelli, Terry & Wands

[57] ABSTRACT

A digital signal recording and reproducing apparatus comprising a dynamic range compression/expansion apparatus. The compression/expansion apparatus receives a digital signal from, for example, an analog-to-digital converter and compresses the dynamic range of the digital signal and the so compressed digital signal is supplied to a recording signal processing circuit in the recording operation mode, while the apparatus receives a digital signal reproduction output from a recording-/reproducing head and expands the dynamic range of the reproduced digital signal and the so expanded digital signal is supplied to, for example, a digital-to-analog converter in the reproducing operation mode. The compression/expansion apparatus includes a circuit for controlling the transient response of the apparatus, that is, for controlling the operation of compression/expansion of the dynamic range of the digital signal during transient of the digital signal so that recording of the digital signal is performed at a high density with a high quality, without suffering breathing effect, overflow, etc.

9 Claims, 9 Drawing Sheets

APPARATUS FOR RECORDING AND REPRODUCING DIGITAL USING DYNAMIC RANGE COMPRESSION

BACKGROUND OF THE INVENTION

The present invention relates to an apparatus for recording and reproducing digital signals.

In a home-use video signal magnetic recording/reproducing apparatus (hereafter abbreviated as VCR) represented by a cassette VTR which is generally used now, the video signal is subject to frequency modulation (FM) and recorded as slant recording tracks on magnetic tape by rotary heads. The audio signal is recorded as longitudinal tracks on an edge portion of the magnetic tape with high frequency bias by a fixed head.

In recent years, the magnetic tape, head and signal recording techniques have significantly advanced. Accordingly, the recording density has been largely increased. High density recording has been effected amounting to an increase of 17 times as compared with the VTR produced approximately 10 years ago.

These high density recording techniques use reduced tape traveling speed and/or narrowed recording track width. The tape traveling speed is 11 mm/s, for example. And the track width is 20 $\mu$m, for example.

In the audio signal recording system using a fixed head, such a low tape traveling speed deteriorates the wow flutter characteristics, the signal-to-noise ratio at the reproduction, reproduction frequency characteristics, or the like, resulting in an insufficient sound quality. Thus, it is difficult to simultaneously satisfy needs of reduction in size, weight and cost and needs of improvement in picture quality and sound quality.

In accordance with one method for making both needs compatible, the audio signal is also converted into an FM signal and recorded onto a video signal recording track by a rotary head. By using this method, the deterioration in the sound quality such as the wow flutter characteristics, signal-to-noise ratio at reproduction and reproduction frequency characteristics is eliminated, and the audio signal is reproduced with high sound quality. In this system, however, the audio signal and the video signal are recorded on an identical part of an identical track. This results in a problem that the after-recording of the audio signal (recording of the audio/video signal onto tape having the information already recorded thereon) is impossible in the editing operation or the like.

Therefore, another method for making the above described needs compatible is described in JP-A-55-32296 (laid open on Mar. 4, 1980). In accordance with this method, the magnetic tape is wound around a rotary cylinder with an angle larger than in the prior art by $\theta$, and one track is divided into a video signal recording track portion and an audio signal recording track portion (corresponding to the $\theta$ part). On this audio signal recording track, the time-compressed audio signal is recorded. As a result, it becomes possible to improve the sound quality compatible with the audio dubbing function.

As the application of this method, a VCR having a mode for recording the video signal plus the audio signal and a mode for recording only the audio signal has been proposed in JP-A-58-222402 (laid open on Dec. 24, 1983). In this VCR, the video signal recording track is divided into a plurality of parts. The time-compressed audio signal is recorded onto each of the tracks thus divided. A similar technique is disclosed in U.S. Pat. No. 4,558,378.

In the home-use VCR, it is necessary to prolong the recordable time of the magnetic tape as far as possible and raise the tape usage efficiency. Therefore, it is desirable that the area for recording the above described time-compressed audio signal is made as small as possible.

However, there is a limit in the wavelength which can be recorded on the magnetic tape. In high density home-use recording VCRs now in use, the recordable wavelength is approximately 7 to 8 MHz at most.

On the other hand, the requisites for attaining the high sound quality are as follows:
Dynamic range: 80 dB or more
Frequency band: 15 KHz or more
Assuming that the pulse code modulation (PCM) is used to obtain this sound quality, even audio signal data needs:

$$32(\text{KHz}) \times 16(\text{bit}) \times 2(\text{ch}) \approx 1.024 \text{ Mbits/s}$$

That is, for achieving a 15 KHz frequency band, the frequency at which the audio signal is sampled must be 32 KHz. For achieving an 80 dB dynamic range, the number of bits for quantization of one sampled data or value must be 16 bits, and for stereophonic recording and reproduction, 2 channels (left and right channels) are required. Thus, for audio data, 3,200 (sampling frequency)$\times$16 (quantization bit number)$\times$2 (channel number)=1.024 M bits is required per second. Assuming that the time base is compressed to one-sixth (audio signal recording area corresponding to approximately 30° of tape wrap angle; and video signal recording area corresponding to 180° of tape wrap angle), the transmission rate of the audio data required for the recording operation is represented as:

$$1.024(\text{Mbit/s}) \times 6 = 6.144(\text{Mbits/s})$$

Besides this, it is necessary to record the address data, the error correction data, and the like. The required transmission bit rate of the recording signal depends upon the modulation scheme and is 10 to 15 Mbits/s.

In order to attain the above described improvement of sound quality, after-recording function of the audio signal and high density recording operation, it is indispensable to use a signal recording method facilitating reduction in transmission bit rate and assuring a high sound quality. The above described prior art does not pay attention to these points.

SUMMARY OF THE INVENTION

An object of the present invention is to provide a digital signal recording/reproducing apparatus having an ability of high sound quality for recording, high density recording and after-recording of sound or picture.

In accordance with one aspect of the present invention, the dynamic range of a digital signal (obtained by converting an input audio signal into a digital signal of, say, 16 bits by an analog-to-digital converter) is compressed (to, say, logarithmically half) by compression means, and thereby the information bits of the digital signal are compressed (into, say, 10 bits). The resultant signal undergoes processing such as time-base compression and modulation to be recorded on a recording medium such as a magnetic tape. During the reproduction operation, a digital signal having, say, 10 bits derived by applying the demodulation and time-base expansion to the reproduced signal is expanded (to a 16-bit digital signal, for example) to have the original dynamic range by expansion means having characteristics opposite to the above described dynamic range compression characteristics. The digital signal thus expanded is supplied to a digital-to-analog converter, for example, to produce a reproduced audio signal. It is thus possible to compress the number of bits of the recorded digital signal at least to half while maintaining a high sound quality dynamic range not less than 80 dB and a frequency band not narrower than 15 KHz.

In accordance with another aspect of the present invention, each of the above described means for compressing the dynamic range of the digital signal and means for expanding it comprises a second emphasis circuit and a first emphasis circuit respectively including IIR (infinite impulse response) digital filters, a weighting circuit, an amplitude level detection circuit and a division/multiplication circuit. Therefore, the compression means and the expansion means may be provided individually so as to fulfil the operation described below. Alternately, a single compression/expansion means fulfilling the operation described below may be provided. The latter case will now be described.

The operation in the compression mode (i.e., in the recording mode) is as follows. A digital signal composed of, say, 16 bits supplied from an input signal source including a DA converter, for example, is divided by the output signal (compression control signal) of the amplitude level detection circuit supplied with a signal which has been emphasized in its high frequency region by the second emphasis circuit, the first emphasis circuit and the weighting circuit. The dynamic range is thus logarithmically compressed to half. The compressed digital signal composed of, say, 10 bits is obtained as the compressed output signal from the first emphasis circuit.

In the recording mode, the above described first emphasis circuit and weighting circuit have identical high-frequency emphasis characteristics. During the normal state (i.e., the operation period of the detection circuit), a compressed digital signal supplied with only characteristics of the second emphasis circuit is obtained. Under the state corresponding to the insensitive period of the detection circuit (i.e., the state where a small high-frequency signal is superimposed over a large-amplitude low-frequency signal), a compressed digital signal supplied with characteristics of both the second emphasis circuit and the first emphasis circuit is obtained. This reduces noises generated by the compression of the dynamic range for the reduction of the transmission bit rate. That is to say, the breathing phenomenon of noises caused by the changing noise level is reduced.

Further, the transition response modifying signal is generated in the amplitude level detection circuit. The transition response modifying signal provides short attack time characteristics in order to prevent the overflow caused by the emphasis when a large signal level has been suddenly inputted instead of a small signal level. When a large signal level has been suddenly replaced by a small signal level, the transient response modifying signal provides recovery time characteristics after the compression operation ceases for a predetermined time (i.e., hold time characteristics) in order to lessen the breathing phenomenon during the small signal period.

The operation in the expansion mode (i.e., in the reproduction mode) will now be described. A reproduced digital signal (composed of 10 bits, for example) is de-emphasized in the high frequency region by the second emphasis circuit and the first emphasis circuit. And the reproduced digital signal composed of 10 bits is emphasized in the high frequency region by the weighting circuit and amplitude-detected in the amplitude level detection circuit to produce an output signal (i.e., expansion control signal). The above described de-emphasized signal is multiplied with the expansion control signal to expand the dynamic range to the original range.

The above described first emphasis circuit and second emphasis circuit are so controlled by a mode switching signal as to have high-frequency de-emphasis characteristics during the reproduction operation opposite to characteristics provided during the recording operation. Further, the detection circuit has attack time characteristics, hold time characteristics and recovery time characteristics similar to those of the recording operation. In the above described compression/expansion apparatus, the second emphasis circuit may be omitted as occasion demands.

In this way, the transmission bit rate is reduced by the compression of the dynamic range while preventing the sound quality deterioration such as the breathing phenomenon or overflow caused by the compression of the dynamic range.

Since the above described compression and expansion are carried out by using digital signal processing, non-uniformity in characteristics such as attack time characteristics, hold time characteristics, recovery time characteristics and emphasis characteristics due to non-uniformity in devices is prevented. Since it is not necessary to adjust the time constant, level, and the like and use peripheral components for the time constant or the like, a small-sized, light-weight digital signal recording-/reproducing apparatus suitable for the implementation such as an IC may be provided.

Several other aspects of the present invention yield effects as described below.

(1) The transmission bit rate is reduced by compressing the dynamic range of the digital signal. In addition, the sound quality deterioration such as the breathing phenomenon and overflow caused by the compression-/expansion of the dynamic range is prevented by providing two circuit paths of the emphasis circuit and the weighting circuit and by establishing transient response characteristics including the attack time characteristics, hold time characteristics and recovery time characteristics. The low transmission bit rate and high sound quality can thus be attained.

(2) Since the compression/expansion of the dynamic range is carried out by digital processing, advantages as described below are obtained.

(i) There is no change in characteristics (such as emphasis, attack, hold, or recovery) from device to device.

(ii) Since the time constant circuits of the above described emphasis circuit and the like determine the coefficient data, peripheral components and adjustment positions are not required.

(iii) The IC implementation and high-density integration are easy.

(3) The compression/expansion operation of the compression/expansion apparatus may be commonly used both for recording and reproduction operation by means of coefficient data switching.

(4) As a synthetic result of the above described items (1) to (3), it is possible to construct a digital signal recording/reproducing system having a very small size and a light weight.

DESCRIPTION OF THE PREFERRED EMBODIMENTS

Figure 1:
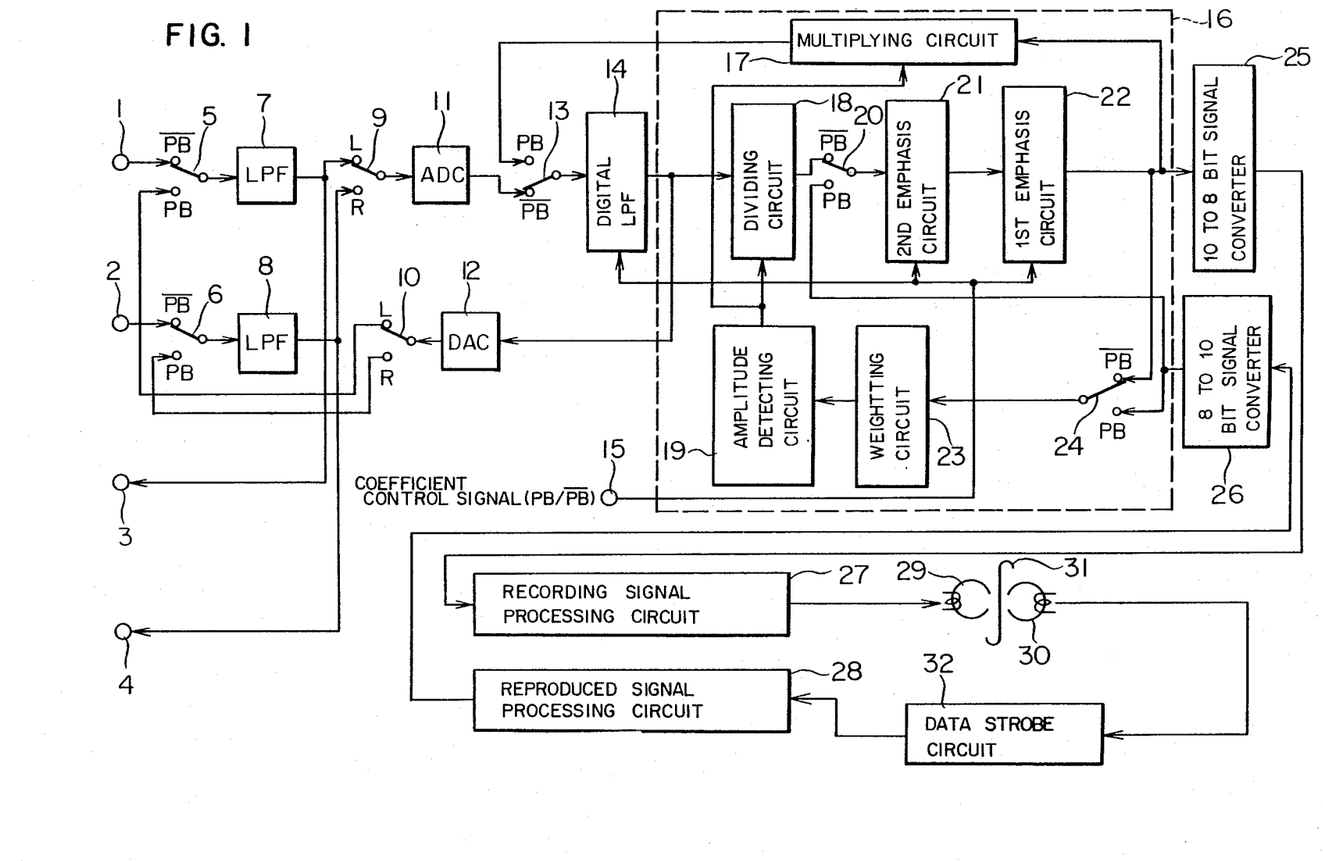
FIG. 1 is a block diagram for illustrating an embodiment of the present invention.

FIG. 1 is a block diagram for illustrating an embodiment of a digital signal recording/reproducing apparatus.

The left (L) and right (R) audio signals to be recorded are inputted to input terminals 1 and 2. The input audio signal is supplied to band restriction filters (LPF) 7 and 8 via $\overline{PB}$ contacts of switches 5 and 6, respectively. The input audio signal is band-limited to below, say, half of the sampling frequency (64 KHz, for example) in order to prevent the aliasing noise. Output signals of the LPF 7 and LPF 8 are converted into a digital signal of L - R series comprising, say, 16 bits by a switch circuit 9 and an AD conversion circuit (ADC) 11. The output signal of the ADC 11 is supplied to a digital LPF 14 via the $\overline{PB}$ contact of a switch 13. Only the frequency components belonging to the recorded audio signal band (up to, say, 15 KHz) are thus passed and undergo the sampling frequency conversion (from 64 KHz to 32 KHz, for example). Thereafter, the dynamic range of the input audio signal is logarithmically compressed at a ratio of, say, ⅝ to ½ in a compression/expansion apparatus 16. In this case, data compression from 16-bit data to 10-bit data is carried out. The output signal of the compression/expansion apparatus 16 is supplied to a 10 to 8 bit signal converter, where segment compression is applied to 10-bit data to produce 8-bit data. In a recorded signal processing circuit 27 including a PCM modulation circuit, the error correction data, address and the like are added to the 8-bit data and the resultant data undergoes the time-base compression and modulation. The resultant data is recorded onto magnetic tape 31 by a rotary head 29.

A signal reproduced from the magnetic tape 31 by a rotary head 30 undergoes waveform equalizing processing and thereafter undergoes data reproduction in a data strobe circuit 32 to produce a reproduced digital signal. This reproduced digital signal undergoes demodulation, time-base expansion and the like in a reproduced signal processing circuit including a PCM demodulation circuit to produce 8-bit reproduced data. The output signal of the PCM demodulation circuit 28 undergoes data expansion from 8-bit data to 10-bit data in an 8 to 10 bit signal converter, and then expanded to the original dynamic range in the compression/expansion apparatus 16, resulting in 16-bit data. The first emphasis circuit 21 and the second emphasis circuit 22 are so controlled by a coefficient switching control signal as to have characteristics which are different from those obtained during the recorded signal processing. The output signal of the compression/expansion apparatus 16 is supplied to the digital LPF 14 having characteristics altered by the coefficient switching control signal. In the digital LPF 14, unnecessary band components are eliminated and the sampling frequency is converted (from 32 KHz to 64 KHz). The output signal of the digital LPF 14 is converted into an analog audio signal by a DA conversion circuit (DAC) 12. The analog audio signal is alternately assigned to two channel signals L and R by a switch circuit 10. After unnecessary components have been eliminated by SW 5, SW 6, LPF 7 and LPF 8, the reproduced audio signal is outputted from output terminals 3 and 4.

The compression/expansion apparatus 16 comprises a second emphasis circuit 21, a first emphasis circuit 22, a weighting circuit 23, an amplitude detecting circuit 19, a dividing circuit 18, a multiplying circuit 17, and switches 20 and 24. Each of the second emphasis circuit 21, the first emphasis circuit 22, the weighting circuit 23 and the amplitude detecting circuit 19 may be constructed of an IIR (infinite impulse response) digital filter. Further, switching between contacts $\overline{PB}$ and PB in the switches 5, 6, 13, 20 and 24 may be effected by the use of a coefficient control signal supplied to input terminal 15 (which will be later described), though this is not particularly shown. The operation of the compression/expansion apparatus 16 will now be described by referring to flow charts shown in FIGS. 2 and 3.

Figure 2:
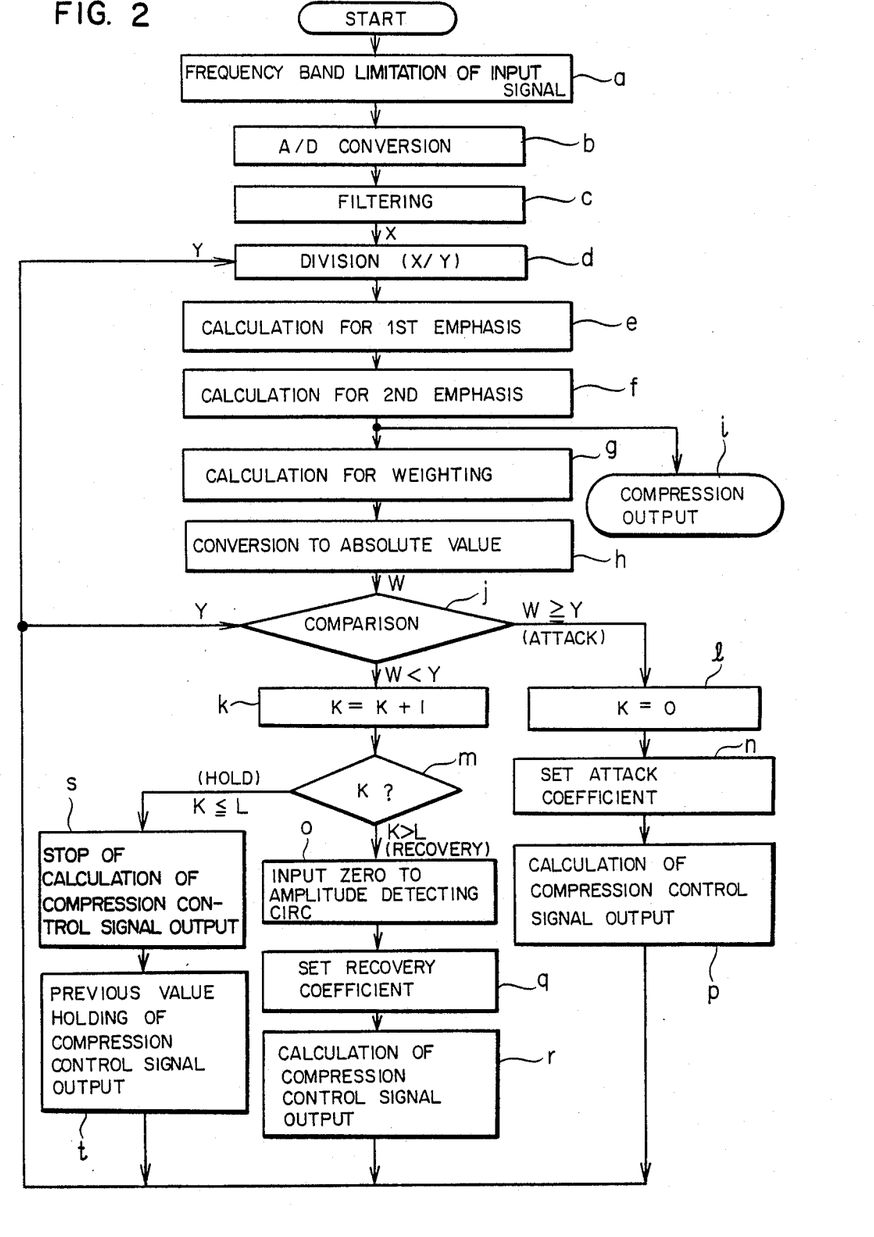
FIGS. 2 and 3 are flow charts used for explaining the operation of the apparatus of FIG. 1.

At first, the recording operation mode will now be described by referring to FIGS. 1 and 2. The output signal X of the digital LPF 14 (step c) is divided by the output signal (compression/expansion control signal) Y of the amplitude detecting circuit 19 in the dividing circuit 18 (step d). The output signal of the dividing circuit 18 is supplied to the second emphasis circuit 21 and the first emphasis circuit 22 via the $\overline{PB}$ contact of the switch 20 to be emphasized at its high frequency region (steps e and f). The signal thus emphasized is outputted to the 10 to 8 bit signal converter 25 as the compressed output. Further, a part of the output of the emphasis circuit 22 is supplied to a combination of the weighting circuit 23 and the detecting circuit 19, which contributes to the generation of the compression/expansion control signal for controlling the compression/expansion characteristics of the compression/expansion apparatus, via the $\overline{PB}$ contact of the switch 24. The weighting circuit 23 has characteristics identical with the emphasis circuit 22 during the compression operation. The output signal of the emphasis circuit 22 is further emphasized in its high frequency region by the circuit 23 (step g) and thereafter supplied to the amplitude detecting circuit 19. In the detecting circuit 19, the output of the weighting circuit 23 is at first converted into an absolute value (step h). This output absolute value W is compared with the output signal Y of the detecting circuit 19 which is the compression/expansion signal of the compression/expansion apparatus 16. On the basis of the comparison result, the transient response modifying signal is issued. The detecting circuit 19 operates in one of the three operation modes, i.e., hold, recovery and attack modes which define the transient response characteristics of the compression/expansion apparatus 16 (steps j, k and m).

The attack mode is assumed when the detection output signal Y does not exceed the output signal W of the absolute value conversion (W≧Y) at step j. In the attack mode, the attack coefficient is established as the detecting circuit constant of the detecting circuit 19. (For example, attack time 3 ms is set.) In the attack mode, the input signal level to the compression/expansion apparatus 16 is also detected, and the compression/expansion control signal Y is outputted (steps n and p).

The hold mode and the recovery mode are assumed when W<Y at the step j. At first, the hold mode is assumed. (The detection operation is stopped and the detected output is held, namely, holding of the previous value is effected.) After a predetermined time has elapsed (step m), the recovery mode is assumed. Accordingly, K represents the duration during which the holding of the previous value is effected and L represents the predetermined time.

In the hold mode, the operation of the compression/expansion apparatus 16 is held for a predetermined time (15 ms, for example) in order to lighten the breathing effect caused by the compression/expansion. At first, the calculation of the amplitude detecting circuit 19 is stopped during the hold period. During that hold period, the compression/expansion control signal derived before the stopping of calculation is held (steps s and t).

The recovery mode is assumed after the hold period (lasting for 15 ms, for example) has been finished. During the recovery period (lasting for 40 ms, for example), the input signal level to the amplitude detecting circuit 19 is nullified. After the recovery coefficient has been set as the detecting circuit constant of the circuit 19, the output calculation result of the control signal of the detecting circuit 19 is outputted (steps o, q and r). Since the weighting circuit 23 has characteristics identical with the emphasis circuit 22 during the compression operation of the apparatus 16, only the characteristics of the emphasis circuit 21 is added during the normal state (i.e., during the operation period of the detecting circuit 19). During the transition state (i.e., during the insensitivity state of the detecting circuit 19), characteristics of both the emphasis circuit 21 and the emphasis circuit 22 are added. In this way, the breathing phenomenon is lessened or suppressed and the sound quality deterioration caused by the dynamic range compression/expansion is prevented.

Figure 3:
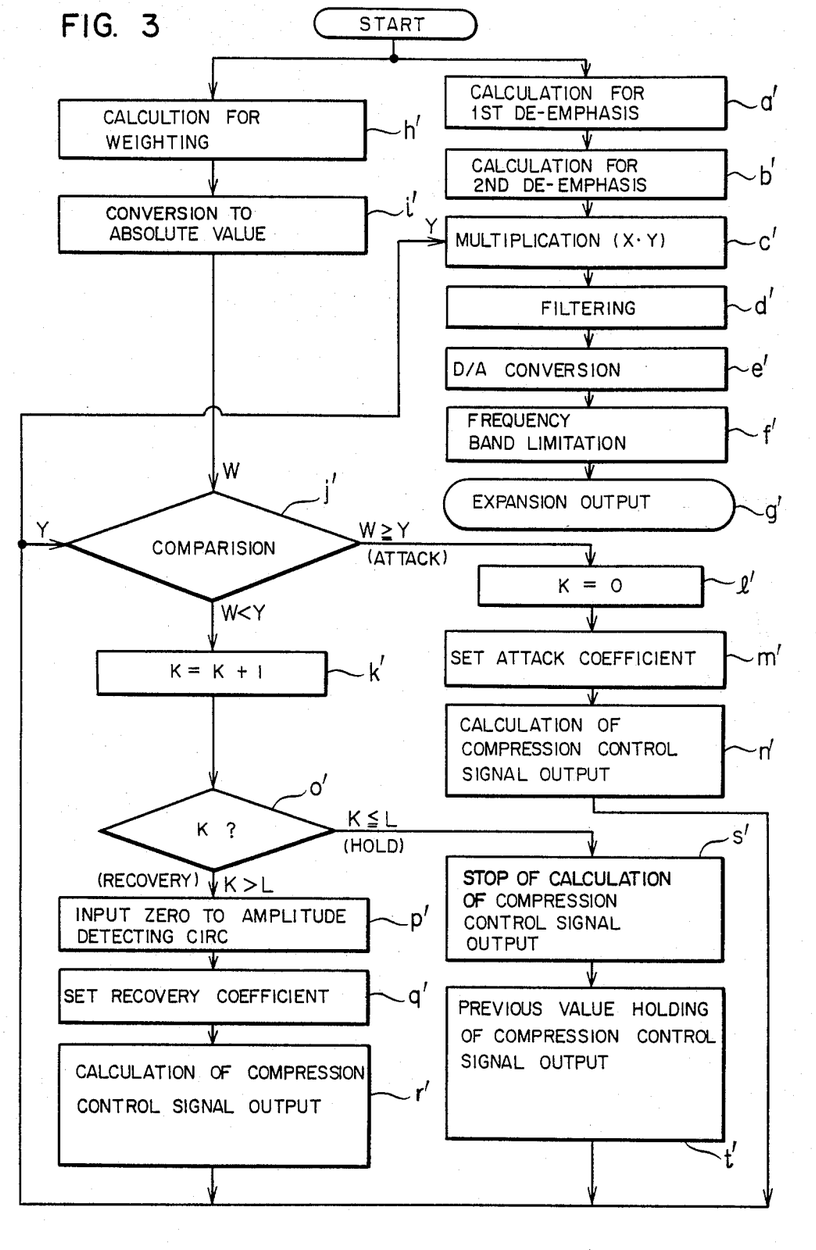

The reproducing operation mode will now be described by referring to FIGS. 1 and 3.

The output signal of the 8 to 10 bit signal converter 26 is supplied to the weighting circuit 23 and the second emphasis circuit 21 via the PB contacts of the switches 20 and 24 (steps h' and a'). Here, the coefficients of the emphasis circuits 21 and 22 are switched on the basis of the coefficient control signal inputted from an input terminal 15 and have de-emphasis characteristics (high frequency de-emphasis characteristics). The output of the second emphasis circuit is inputted to the first emphasis circuit 22 (step b'). On the other hand, the output signal of the weighting circuit 23 is inputted to the amplitude detecting circuit 19 (steps j' to t'). De-emphasis characteristics of the circuits 21 and 22 cancel (or form inverse characteristics to) the respective emphasis characteristics of the apparatus 16 during the compression operation. The output signal of the emphasis circuit 22 is supplied to the multiplying circuit 17. On the other hand, the output signal (compression/expansion control signal) of the detecting circuit 19 is also supplied to the multiplying circuit 17. Each multiplication result (step c') is passed through the PB contact of the switch 13, digital LPF 14, DAC 12, switch circuit 10, switches 5 and 6, and LPFs 7 and 8 to be outputted from the output terminals 3 and 4 as the expanded output (steps d', e', f' and g'). Since the operation of the amplitude detecting circuit 19 is the same as that of FIG. 2, it will not be described.

In the embodiment heretofore described, 16-bit data are compressed to 8-bit data. That is to say, the audio data are compressed to half. Accordingly, the transmission bit rate of the recorded signal can be reduced at least to half. As for the sound quality,
(1) sampling frequency: 32 KHz
(2) the number of quantization bits: 16 bits
yield
(1) audio frequency band: 15 KHz or more
(2) dynamic range: 90 dB or more.

Figure 4:
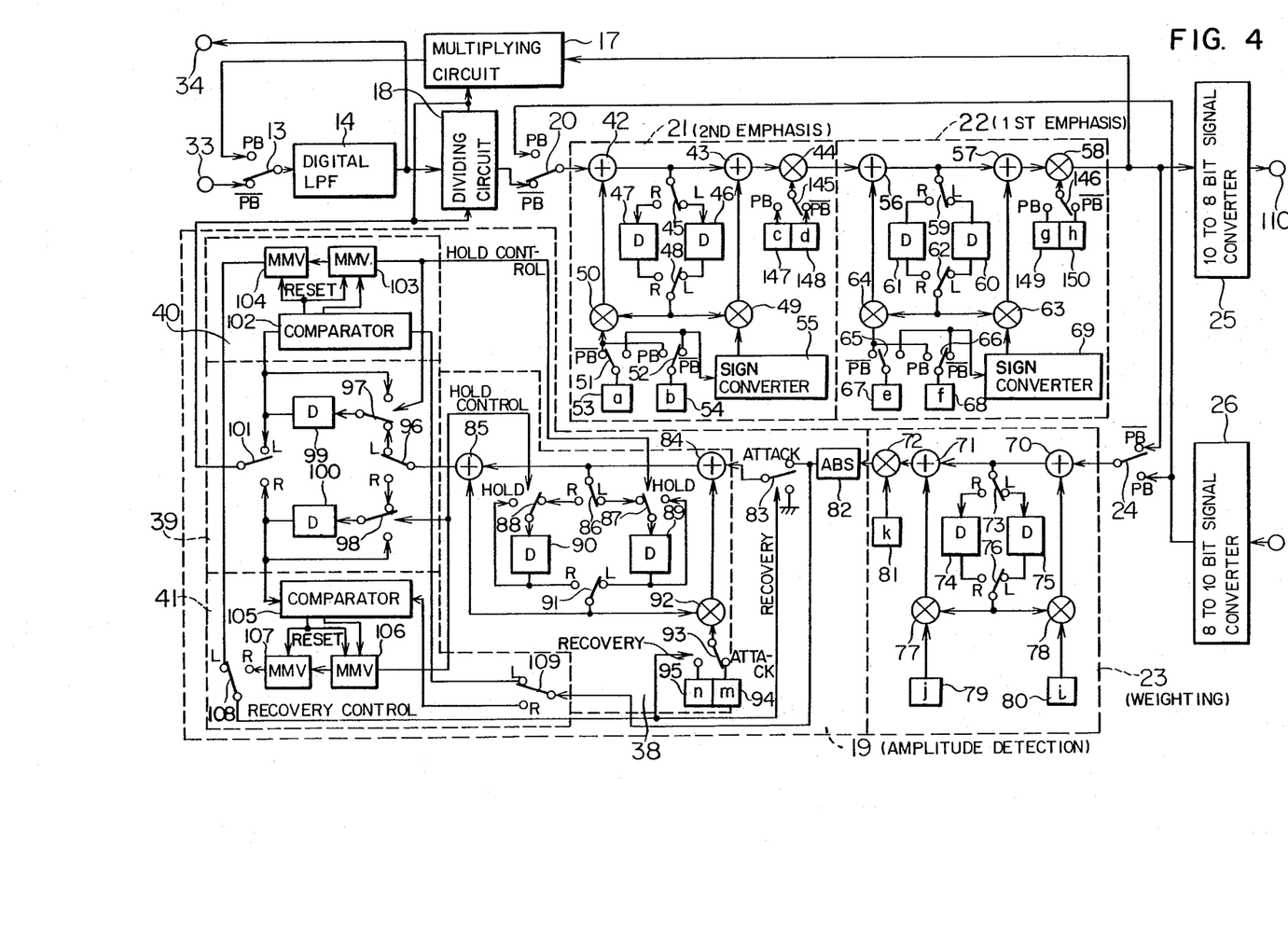
FIGS. 4 and 5 are block diagrams for illustrating an example of a concrete configuration of a compression/expansion apparatus used in an embodiment shown in FIG. 1.

An example of a concrete circuit configuration of the compression/expansion apparatus 16 is shown in FIG. 4.

In FIG. 4, blocks 21 and 22 surrounded by broken lines represent the second emphasis circuit and the first emphasis circuit, respectively. Block 23 represents the weighting circuit and block 19 represents the amplitude detector. The emphasis circuit 21, the emphasis circuit 22 and the weighting circuit 23 are constructed of IIR digital filters having similar structures. And respective circuits are so controlled by changeover switches as to correspond to the R signal and L signal alternately sent out.

The emphasis circuit 21 includes adders 42 and 43, multipliers 44, 49 and 50, latch circuits 46 and 47 for delay, switches 45 and 48 for switching L and R signals, coefficient memories 53, 54, 147 and 148 for holding values a, b, c and d, respectively, switches 51, 52 and 145 for switching coefficients, and a negative converter 55. The emphasis circuit 22 includes adders 56 and 57, multipliers 58, 63 and 64, latch circuits 60 and 61 for delay, switches 59 and 62 for switching L and R signals, coefficient memories 67, 68, 149 and 150 for holding values e, f, g and h, respectively, switches 65, 66 and 146 for switching coefficients, and a negative converter 69. The weighting circuit 23 includes adders 70 and 71, multipliers 72, 77 and 78, latch circuits 74 and 75 for delay, switches 73 and 76 for switching L and R signals, and coefficient memories 79, 80 and 81 for holding values j, i and k, respectively.

The amplitude detecting circuit 19 includes a detecting circuit portion 38, an absolute value converting circuit portion 82, a hold circuit portion 39, transition response modifying signal generating circuit portions 40 and 41. The detecting circuit portion 38 includes adders 84 and 85, a multiplier 92, latch circuits 89 and 90 for delay, switches 86 and 91 for switching L and R signals, coefficient memories 94 and 95 for holding value m (attack coefficient) and value h (recovery coefficient), respectively, a switch 93 for switching coefficients, and switches 83, 87 and 88 for attack, recovery and hold control. The detecting circuit portion 38 has a large time constant (a low cut-off frequency) as compared with that of the circuit portion 82. The hold circuit portion 39 includes latch circuits 99 and 100 for delay, switches 96 and 101 for switching L and R signals, and switches 97 and 98 for holding. The transition response modifying signal generating circuit portions 40 and 41 include comparator circuits 102 and 105, monostable multivibrators (MMV) 103, 104, 106 and 107, and switches 108 and 109 for switching L and R signals. The circuit portion 40 is provided for controlling the L signal, and the circuit portion 41 is provided for controlling the R signal.

Examples of coefficients of the emphasis circuit 21, the emphasis circuit 22, the weighting circuit 23 and the detecting portion 38 are shown in Table 1. Coefficients of the emphasis circuit 21 and the amphasis circuit 22 are switched between the recording period ($\overline{PB}$) and the reproducing period (PB).

TABLE 1
Coefficient Values of Respective Portions

| Coefficient name | Recording ($\overline{PB}$) | Reproducing (PB) |
|---|---|---|
| Second emphasis circuit | | |
| a | 0.24377 | 0.69936 |
| b | −0.69936 | −0.24377 |
| c | 2.51541 | — |
| d | — | 0.39755 |
| First emphasis circuit | | |
| e | 0.37035 | 0.69936 |
| f | −0.69936 | −0.37035 |
| g | 2.09437 | — |
| h | — | 0.47747 |
| Weighting circuit | | |
| i | 0.37035 | 0.37035 |
| j | −0.69936 | −0.69936 |
| k | 2.09436 | 2.09436 |
| Detecting circuit portion | | |
| m | 0.98 | 0.98 |
| n | 0.99 | 0.99 |

Since it is only necessary that the characteristics during the recording operation are opposite to those during the reproducing operation, only switches for switching coefficients and sign converters are required.

In FIG. 4, respective blocks primarily consist of IIR digital filters having identical structures. In the integrated circuit (IC) implementation, therefore, an embodiment as shown in FIG. 5 may be adopted.

Figure 5:
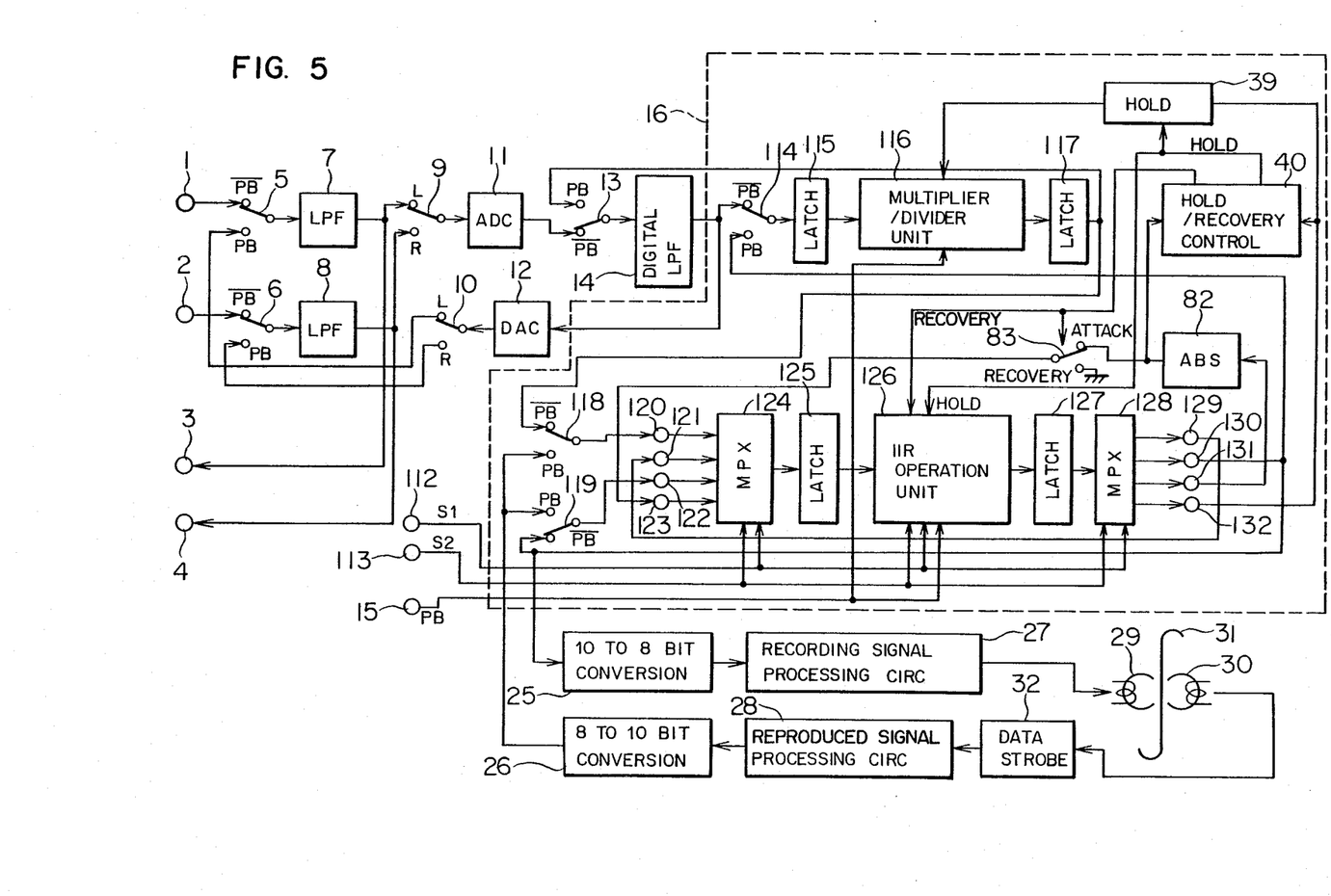
Figure 6:
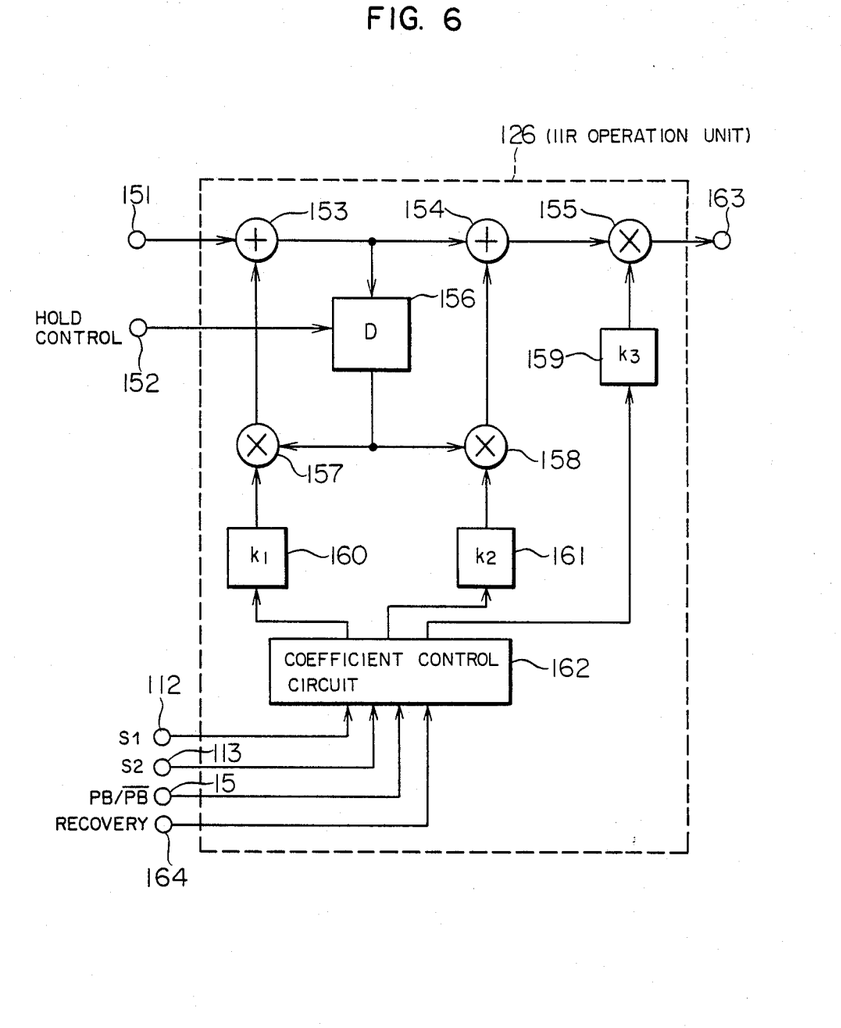
FIGS. 6 and 7 are block diagrams for illustrating an example of a concrete configuration of a main part of the compression/expansion apparatus shown in FIG. 5.

In FIG. 5, an IIR operation unit 126 serves as IIR digital filters forming one basic structure of the compression/expansion apparatus 16. An example of the contifiguration of the IIR operation unit is shown in FIG. 6. In FIG. 5, a multiplying/dividing unit 116 serves as the dividing circuit 18 and the multiplying circuit 17. Therefore, multiplexers 124 and 128, latch circuits 115, 117, 125 and 127, and changeover switches 118 and 119 are used.

The multiplexers (MPX) 124 and 128 are controlled by selection signals S1 and S2 inputted from input terminals 112 and 113. Their control modes are shown in Table 2.

TABLE 2
Operation of Multiplexers

| S1 | S2 | Multiplexer 124 | Multiplexer 128 |
|---|---|---|---|
| 0 | 0 | Terminal 120 | Terminal 129 |
| 0 | 1 | Terminal 121 | Terminal 130 |
| 1 | 0 | Terminal 122 | Terminal 131 |
| 1 | 1 | Terminal 123 | Terminal 132 |

0: Low level
1: High level

The IIR operation unit 126 may include multipliers 155, 157 and 158, adders 153 and 154, a delay circuit 156, and coefficient circuits 159, 160 and 161 as shown in FIG. 6 to carry out the operation. Respective coefficients are controlled by a coefficient control circuit 162 on the basis of selection signals S1 and S2 inputted from the input terminals 112 and 113 and a coefficient control signal ($\overline{PB}$/PB) inputted from the input terminal as shown in Table 3. The delay circuit in the IIR operation unit 126 is so configured that respective data of signals R and L may be memorized and signals R and L may be alternately processed in the same way as FIG. 4. The delay circuit is also controlled by a hold control signal inputted from an input terminal 152. Numerals 151 and 163 denote an input terminal and an output terminal of the unit 126, respectively.

TABLE 3
Coefficient Control of IIR Operation Unit

| PB/$\overline{PB}$ | S1 | S2 | k1 | k2 | k3 |
|---|---|---|---|---|---|
| $\overline{PB}$ | 0 | 0 | 0.24377 | −0.69936 | 2.51541 |
| $\overline{PB}$ | 0 | 1 | 0.37035 | −0.69936 | 2.09437 |
| $\overline{PB}$ | 1 | 0 | 0.37035 | −0.69936 | 2.09437 |
| $\overline{PB}$ | 1 | 1 | Attack 0.98 Recovery 0.99 | 1.0 | 1.0 |
| PB | 0 | 0 | 0.69936 | −0.24377 | 0.39755 |
| PB | 0 | 1 | 0.69936 | −0.37035 | 0.47747 |
| PB | 1 | 0 | 0.37035 | −0.69936 | 2.09437 |
| PB | 1 | 1 | Attack 0.98 Recovery 0.99 | 1.0 | 1.0 |

Figure 7:
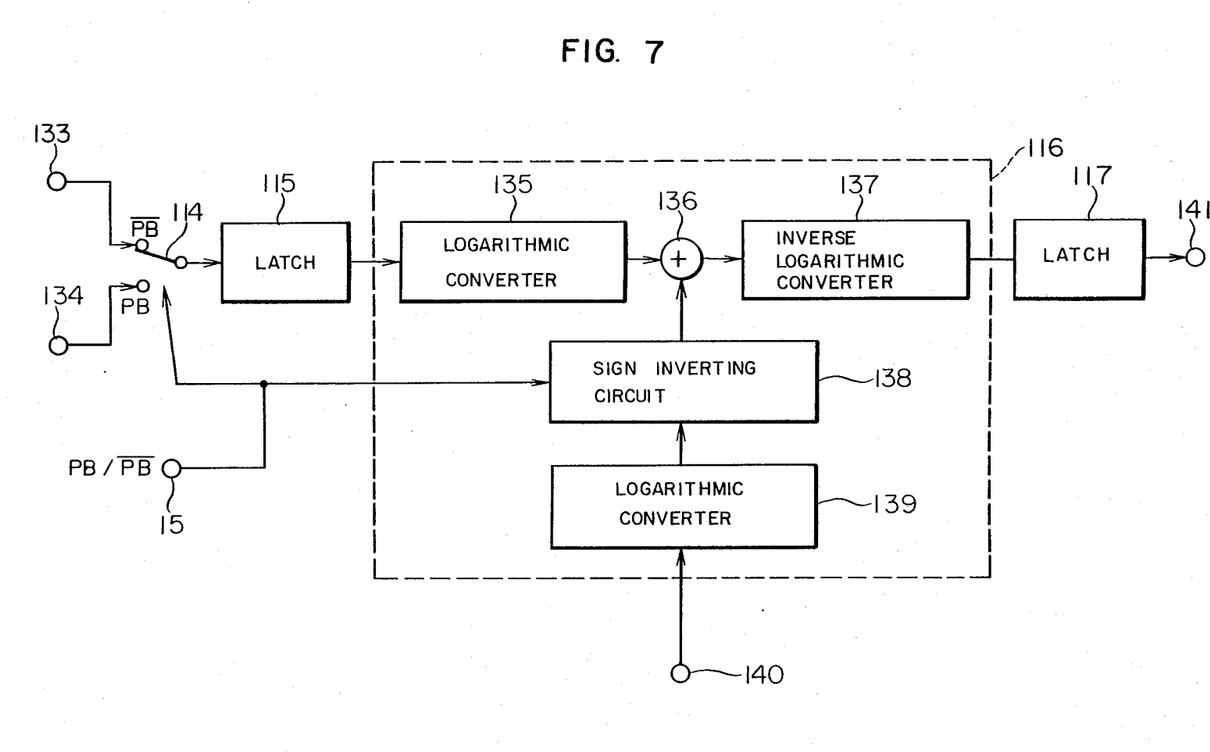

An example of the concrete configuration of the multiplying/dividing unit 116 illustrated in FIG. 5 is shown in FIG. 7.

In FIG. 7, the multiplying/dividing unit 116 includes logarithmic conversion circuits 135 and 139 for converting natural numbers into logarithms having bases 2, an adder 136, an inverse logarithmic conversion circuit 137 for converting logarithms into natural numbers, and a sign inverting circuit 138. On the basis of the PB/$\overline{PB}$ control signal inputted from the input terminal 15, the above described sign inverting circuit 138 controls the adder 136 so that the output of the adder 136 may not be inverted during the PB operation and may be inverted during the $\overline{PB}$ operation. Assuming that X is inputted from an input terminal 133 and Y is inputted from an input terminal 140 during the $\overline{PB}$ operation, $$\log_2 X - \log_2 Y = \log_2 X/Y \tag{1}$$

is inputted to the inverse logarithmic converting circuit 137. From an output terminal 141, $$\log_2{}^{-1}(\log_2 X/Y) = X/Y \tag{2}$$

is outputted, resulting in division. Here, $\log_2{}^{-1}$ represents inverse logarithmic conversion.

If X is inputted from the input terminal 133 and Y is inputted from the input terminal 140 during the PB operation, $$\log_2 X + \log_2 Y = \log_2 X \cdot Y \tag{3}$$

is inputted to the inverse logarithmic conversion circuit 137. From the output terminal 141, therefore, $$\log_2{}^{-1}(\log_2 X \cdot Y) = X \cdot Y \tag{4}$$

is outputted, resulting in multiplication.

Accordingly, multiplication/division is carried out simply by inverting/noninverting the sign. By using the configuration shown in FIG. 5, the IC implementation with a small-sized circuit thus becomes possible.

Figure 8A:
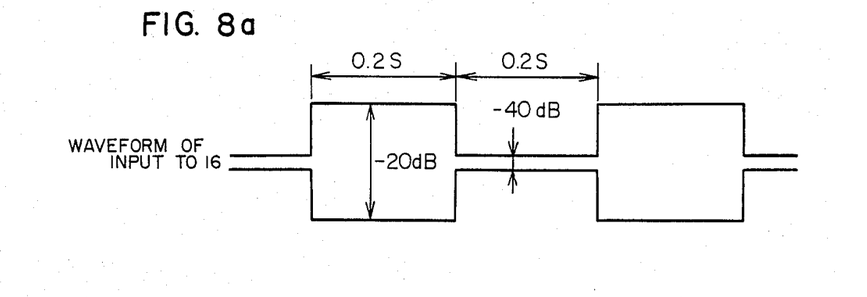
FIGS. 8a to 8c are waveform diagrams used for explaining an example of the transition characteristics of FIG. 1, 4 and 5.
Figure 8B:
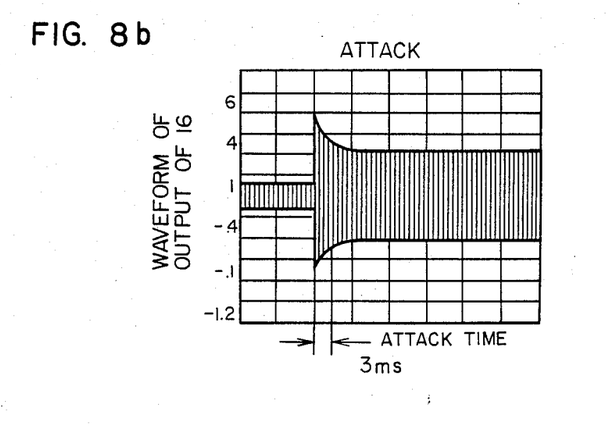
Figure 8C:
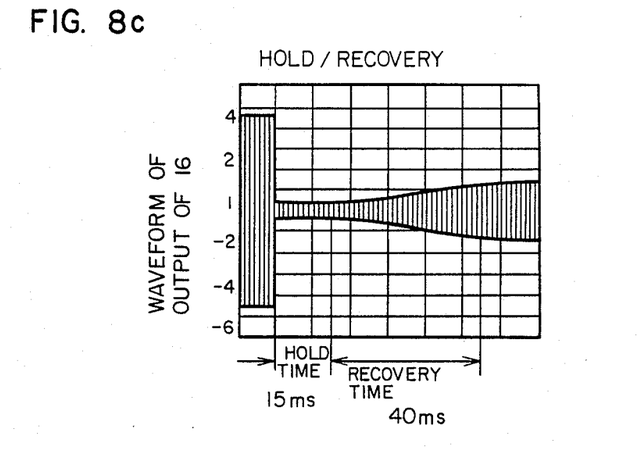

An example of transition response characteristics of the compression/expansion apparatus derived in the embodiment of the present invention which has heretofore been described by referring to FIGS. 4 and 5 is shown in FIGS. 8a to 8c. These transition response characteristics include attack time characteristics, hold time characteristics, and recovery time characteristics.

In this way, the reduction of transmission bit rate using dynamic range compression/expansion is attained concurrently with the prevention of sound quality deterioration such as breathing or overflow caused by the dynamic range compression/expansion. In addition, the processing of the emphasis characteristics, attack time characteristics, hold time characteristics, recovery time characteristics and the like attendant upon the dynamic range compression/expansion can be easily carried out simply by changing the coefficient data. Not only the characteristics variation due to the non-uniformity in devices but also peripheral components such as the time constant circuit are eliminated, IC implementation being facilitated. Further, the compression means and expansion means in the recording/reproducing operation can be realized by a common circuit. In cooperation with the above described merit of IC implementation, therefore, a digital signal recording/reproducing system having an extremely small size and a light weight can be constructed.

Figure 9:
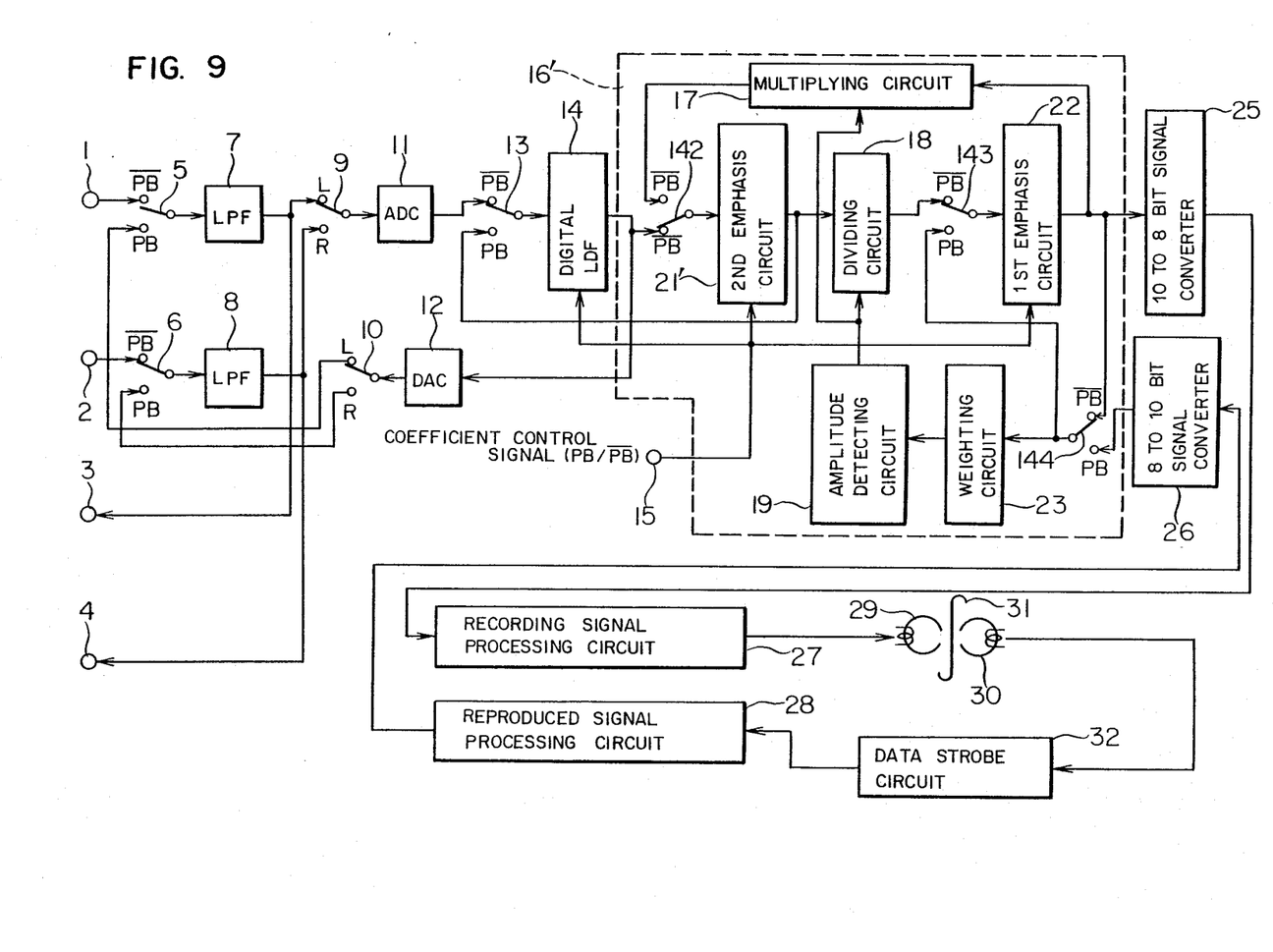
FIG. 9 is a block diagram for illustrating another embodiment of the present invention.

Another embodiment of the present invention will now be described by referring to FIG. 9. A block having the same function as FIG. 1 is denoted by the identical numeral. During the recording operation (i.e., during the $\overline{PB}$ period), the signals L and R inputted from the input terminals 1 and 2 are supplied to LPFs 7 and 8 via the $\overline{PB}$ contacts of switches 5 and 6, respectively. Each of the signals L and R is limited to a frequency band below, say, half of the sampling frequency (which is, say, 64 KHz) in order to prevent the aliasing noise. Output signals of the LPF 7 and LPF 8 are converted into a digital signal of L-R series comprising, say, 16 bits by a switch circuit 9 and an ADC 11. The output signal of the ADC 11 is supplied to a digital LPF 14 via the $\overline{PB}$ contact of a switch 13. Only the audio band (up to, say, 15 KHz) is passed and the sampling frequency is converted from 64 KHz to 32 KHz in the digital LPF 14. The output signal of the digital LPF 14 is supplied to a compression/expansion apparatus 16'. Within the compression/expansion apparatus 16', the input signal is supplied to the second emphasis circuit 21' via the $\overline{PB}$ contact of a switch 142 to be emphasized at its high frequency region and supplied to a dividing circuit 18. The dividing circuit 18 operates so as to compress the dynamic range of the input audio signal to, say, logarithmically half on the basis of the output signal level (compression/expansion control signal) of an amplitude detecting circuit 19. The output signal of the dividing circuit 18 is supplied to the first emphasis circuit 22 via the $\overline{PB}$ contact of a switch 143 to be further emphasized at its high frequency region. After the resultant signal has been converted into 8-bit data by a 10 to 8 bit conversion circuit 25, it is supplied to a rotary head 29 via a recorded signal processing circuit 27 including a PCM modulation circuit and recorded on a tape. A part of the output signal of the emphasis circuit 22 is supplied to a weighting circuit 23 to be emphasized at its high frequency region. The signal thus emphasized is supplied to the amplitude detecting circuit 19 for detecting the amplitude level. Thus the compression/expansion control signal to be inputted to the dividing circuit 18 for compressing the dynamic range is thus obtained.

In the reproducing mode, operation which is completely inverse with respect to that of the recording mode is carried out and the dynamic range is expanded to, say, twice in the compression/expansion apparatus 16'. That is to say, the output signal (10 bits) of the 8 to 10 bit signal converter is supplied to the first emphasis circuit 22 and the weighting circuit 23 via switches 143 and 144. Coefficients of the two emphasis circuits 21' and 22 are switched to exhibit the characteristics inverse to those of the recording operation ($\overline{PB}$ operation) by the coefficient control signal supplied from an input terminal 15. The signal emphasized at its high frequency region in the weighting circuit 23 is supplied to the detecting circuit 19. The amplitude level is detected by the detecting circuit 19 to produce the detected output as the compression/expansion control signal. The output signal of the emphasis circuit 22 is multiplied with the compression/expansion control signal in a multiplying circuit 17. The dynamic range is thus expanded to its original level. The output of the multiplying circuit 17 is de-emphasized at its high frequency region in the second emphasis circuit 21' during the PB operation. The resultant signal is supplied to a DAC 12 via a switch 13 and a digital LPF 14 to be converted into an analog signal. The output signal of the DAC 12 is supplied to LPFs 7 and 8 for unnecessary signal components to be removed. The reproduced audio signal is thus outputted from output terminals 3 and 4. Further, switching between contacts $\overline{PB}$ and PB in the switches 5, 6, 13 and 142-144 may be effected by the use of the coefficient control signal supplied to the input terminal 15, though this is not particularly shown.

Operation of each block is similar to that of FIGS. 1, 4 and 5 and hence will not be further described.

In this way, it is possible to reduce the recorded data transmission rate at least by half without causing the breathing or overflow, by compressing/expanding the dynamic range in the compression/expansion apparatus 16.

Other configurations may be adopted as the dynamic range compression/expansion apparatus using digital processing technique. That is to say, other configurations may be adopted so long as the dynamic range is compressed by the controlled compression/expansion operation to largely reduce the transmission bit rate and then expanded and the configuration is suitable to the IC implementation.

What is claimed is:

1. A magnetic recording/reproducing apparatus for recording/reproducing digital signals via a plurality of rotary heads, comprising:
   means for converting an input analog signal into a digital signal;
   means for compressing the dynamic range of said digital signal so as to reduce the number of bits of said digital signal; and
   means for recording the output signal of said dynamic range compressing means on a recording medium and reproducing the recorded signal.

2. A magnetic recording/reproducing apparatus according to claim 1, wherein said dynamic range compressing means includes a first emphasis circuit, a second emphasis circuit and a third emphasis circuit for emphasizing a high frequency component of said digital signal, as well as a detecting circuit for detecting an amplitude level of an output of said third emphasis circuit, and wherein characteristics of said first and second emphasis circuits are switched so that the characteristics obtained during the recording operation may be inverse with respect to those obtained during the reproducing operation.

3. A magnetic recording/reproducing apparatus according to claim 2, wherein said first to third emphasis circuits and said detecting circuit comprise IIR digital filters, and filter coefficients of said first and second emphasis circuits are switched depending upon the recording/reproducing operation.

4. An apparatus for compressing the dynamic range of a digital signal for use in a signal recording and reproducing apparatus, the compressing apparatus having a controlled transient response, and comprising:

means for receiving an input digital signal from a signal source;
  means for dividing said input digital signal by a compression control signal;
  first emphasizing means connected with said dividing means for emphasizing the output of said dividing means to provide an emphasized, dynamic range-compressed digital signal corresponding to said input digital signal, said emphasizing means being connectable with said recording and reproducing apparatus for recording of said emphasized, dynamic range-compressed digital signal; and
  means for generating said compression control signal, said compression control signal generating means being interconnected between said emphasizing means and said dividing means for modifying the transient response of said compressing apparatus.

5. A compressing apparatus according to claim 4, in which the compressing apparatus further comprises second emphasizing means interconnected between said dividing means and said first emphasizing means, and said compression control signal generating means includes a weighting circuit connected with the output of said first emphasizing means and an amplitude detecting circuit interconnected between said weighting circuit and said dividing means, said weighting circuit having characteristics identical with said first emphasizing means.

6. A compressing apparatus according to claim 5, in which said amplitude detecting circuit includes a first circuit portion for converting the output of said first emphasizing means to a corresponding absolute value, a second circuit portion for detecting the level of said absolute value, and a third circuit portion for comparing the output of said second circuit portion and the output of said first circuit portion and producing a transient response modifying signal to be fed to said second circuit portion.

7. A compressing apparatus according to claim 4, in which the compressing apparatus further comprises second emphasizing means interconnected between said receiving means and said dividing means.

8. An apparatus for compressing/expanding the dynamic range of a digital signal for use in a signal recording and reproducing apparatus, the compressing/expanding apparatus having a controlled transient response, and comprising:

means for receiving a first input digital signal to be recorded from a signal source;
  means for receiving a second input digital signal to be supplied from said recording and reproducing apparatus;
  means for dividing said first input digital signal by a compression/expansion control signal;
  first switch means having first and second input terminals and one output terminal, said first and second input terminals of said first switch means being supplied with the outputs of said dividing means and said second input signal receiving means, respectively;
  first emphasizing means connected with said output terminal of said first switch means for emphasizing the output of said first switch means to provide an emphasized digital signal, the emphasis characteristics of said emphasizing means being controlled by a mode switching signal, said emphasizing means being connectable with said recording and reproducing apparatus for recording of said emphasized digital signal;
  means for multiplying said second input digital signal with said compression/expansion control signal, said multiplying means being connectable with means for conversion to an analog signal;
  second switch means having first and second input terminals and one output terminal, said first and second input terminals of said first switch means being supplied with the outputs of said emphasizing means and said second input signal receiving means, respectively, said first and second switch means being controlled by said mode switching signal so that the output terminal of each of said first and second switch means is electrically connected with an alternate one of said first and second input terminals; and
  means for generating said compression/expansion control signal, said compression/expansion control signal generating means being interconnected between said output terminal of said second switch means and said dividing means and said multiplying means for modifying the transient response of said compressing/expanding apparatus.

9. A compressing/expanding apparatus according to claim 8, in which the compressing/expanding apparatus further comprises second emphasizing means interconnected between said output terminal of said first switch means and said first emphasizing means, and said compression/expansion control signal generating means includes a weighting circuit connected with said output terminal of said second switching means and an amplitude detecting circuit interconnected between said weighting circuit and said dividing means and said multiplying means, said weighting circuit having characteristics identical with said first emphasizing means when said mode switching signal is in a state for a compression operation of the compressing/expanding apparatus.

* * * * *